United States Patent [19]
Oldham et al.

[11] Patent Number: 5,462,627
[45] Date of Patent: Oct. 31, 1995

[54] MICROWAVE BONDING OF STYROFOAM WITH PHENOL-FORMALDEHYDE COMPOUNDS

[75] Inventors: Susan L. Oldham, Torrance; Jordan L. Rosengard, Woodland Hills, both of Calif.

[73] Assignee: Hughes Aircraft Company, Los Angeles, Calif.

[21] Appl. No.: 339,316

[22] Filed: Nov. 14, 1994

Related U.S. Application Data

[63] Continuation of Ser. No. 139,683, Oct. 22, 1993, abandoned.
[51] Int. Cl.⁶ .................................................. B32B 31/00
[52] U.S. Cl. .......................................... 156/275.7; 156/335
[58] Field of Search .............................. 156/272.2, 275.7, 156/335

[56] References Cited

U.S. PATENT DOCUMENTS

| | | |
|---|---|---|
| 4,018,642 | 4/1977 | Pike et al. . |
| 4,035,216 | 7/1977 | Immel . |
| 4,253,898 | 3/1981 | Rinker et al. . |
| 5,182,357 | 1/1993 | Linden ................................. 528/137 |
| 5,254,197 | 10/1993 | Klems ................................. 156/272.2 |

*Primary Examiner*—Chester T. Barry
*Attorney, Agent, or Firm*—Mary E. Lachman; Michael W. Sales; Wanda Denson-Low

[57] ABSTRACT

Bonding of polystyrene foam details together to produce lost foam molds suitable for casting metallic details is accomplished by coating one of the two mating surfaces of the parts with a phenol-formaldehyde adhesive. The two parts are joined together and the mated assembly is placed in a microwave oven. Exposure of the assembly to microwave energy for a pre-selected period of time effects the bonding.

9 Claims, 1 Drawing Sheet

MICROWAVE BONDING OF STYROFOAM WITH PHENOL-FORMALDEHYDE COMPOUNDS

This is a continuation of application Ser. No. 08/139,683 filed Oct. 22, 1993, now abandoned.

BACKGROUND OF THE INVENTION

1. Field of the Invention

The use of the present invention relates to an improved method for bonding polystyrene foam details together using microwave curing phenol-formaldehyde compounds to produce lost foam molds suitable for casting metallic details.

2. Description of Related Art

The automotive industry employs molds for casting aluminum engine parts (such as heads and blocks) by bonding "lost foam" polystyrene foam details with a hot melt (thermoplastic) glue using an automated adhesive application work station. This work station consists of a rotating turntable fitted with hot platens that mirror the configuration of the polystyrene parts to be bonded. The hot melt adhesive, in the presence of the hot platens, becomes sufficiently fluid to be able to transfer the glue to the bonding surfaces of the polystyrene parts via contact. The parts are then mated prior to the glue cooling in order to achieve an adequate bond.

This process allows the production of approximately five assemblies per minute. However, not only is this process considered to be too slow for the amount of production required, it is inherently messy. The messiness results from the glue flowing into unwanted features on the foam, as well as on and about the bonding work station itself. In addition, any change in foam configuration necessitates a capital expenditure to fabricate the corresponding platen.

U.S. Pat. No. 4,035,216, "Method for Bonding Expanded Polymeric Parts", describes a process for bonding polystyrene foam lost foam patterns together using a water/detergent mixture as the electromagnetic susceptor compound with a microwave energy source. The detergent can make it exceedingly difficult to perform secondary bonding or coating operations on the joined polystyrene foam due to the release layer that has been introduced on these surfaces. Moreover, the residual water from this "solvent" bonding process results in porosity in the resulting aluminum castings produced from these lost foam polystyrene foam molds. This porosity can result in decreases in mechanical strength of the castings, as well as marring surface finish.

U.S. Pat. No. 4,253,898, "Bonding Composition and Microwave Process for Bonding Together Plastic Components", describes a vinyl plastisol composition for microwave bonding of plastic parts. This process is dependent upon the melting of the plastic, which can distort the joined device. This can result in the lost foam details transferring incorrect dimensions to the final metal casting.

U.S. Pat. No. 4,018,642, "Microwave Curing of Alkaline Phenolic Resins in Wood-Resin Compositions", describes the use of phenolic resins for microwave bonding of plywood. No inference with respect to the utility of bonding polystyrene foam lost foam details with this process is mentioned.

Thus, a need exists to provide an improved method for bonding polystyrene assemblies that avoids or minimizes the above mentioned disadvantages.

SUMMARY OF THE INVENTION

In accordance with the invention, an improved method is provided for bonding polystyrene foam details together. The method comprises:

(a) providing polystyrene foam details including at least one shaped non-planar surface;

(b) applying a microwave curing adhesive coating to the surface of a polystyrene foam detail;

(c) placing the adhesive coated polystyrene foam detail in contact with an uncoated mating polystyrene foam detail to produce a mated assembly; and (d) curing the mated assembly of polystyrene foam details using microwave energy to produce a bonded assembly.

The improved method for bonding polystyrene foam details together involves the use of microwave curing, phenol-formaldehyde resins. The phenol-formaldehyde may be applied by brush application ranging in thickness from about 0.0001 to 0.01 inches ($2.54 \times 10^{-4}$ to $2.54 \times 10^{-2}$ centimeters) by using a resin with a solids content of about 57% plus or minus 10% by weight. The phenol-formaldehyde may also be applied by air brush application ranging in thickness from about 0.0001 to 0.001 inches ($2.54 \times 10^{-4}$ to $2.54 \times 10^{-3}$ centimeters) by using a resin with a solids content of about 34% plus or minus 5% by weight. A microwave oven having an output power of about 650 watts at a frequency of about 2550 megahertz (MHz) may be used to cure the bonded assembly of polystyrene foam details. Curing times range from about 25 to 45 seconds for both brush and air brush application of the microwave curing phenol-formaldehyde resin.

The process of the present invention does not rely on processing aids, or foam melting for the production of structural bonds to polystyrene foam. Further, a structural adhesive bond joins the polystyrene foam without introducing porosity in the assembled device. No processing aids are utilized, so secondary bonding or overcoating operations should not be plagued by poorly bondable surfaces.

Finally, the present invention is faster, cleaner, and lends itself to large production rates of the required polystyrene foam assemblies without major capital investment. In addition, the microwave bonding process involves less machinery to malfunction and is environmentally friendly.

DESCRIPTION OF THE PREFERRED EMBODIMENTS

The present invention comprises the use of phenol-formaldehyde compounds to microwave bond polystyrene foam details together to produce lost foam molds suitable for casting metallic details. The phenol-formaldehyde resins comprise any of the commercially available resins. The ratio of formaldehyde to phenol in the adhesive is 1.8 to 2.3 on a molar basis.

Polystyrene foam details having at least one shaped surface are bonded together by applying a phenol-formaldehyde resin as a microwave curing adhesive coating to the surface of one foam detail. The adhesive coating is applied by either brush or air brush application. The adhesive coated polystyrene foam detail is then placed in contact with an uncoated mated polystyrene foam detail to produce a bonded assembly. The bonded assembly is then cured with microwave energy. The curing is achieved by using a microwave oven having output power of about 650 watts at a frequency of about 2550 MegaHertz (MHz) for a duration ranging from about 25 to 45 seconds.

Brush application may be used to apply the phenol-formaldehyde to a thickness of about 0.0001 to 0.01 inches ($2.54\times10^{-4}$ to $2.54\times10^{-2}$ centimeters), with the optimum thickness being about 0.0001 to 0.0003 inches ($2.54\times10^{-4}$ to $7.62\times10^{-4}$ centimeters). In the brush application, the phenol-formaldehyde resin has a solids content within the range of about 47 to 67% by weight.

Alternatively, air brush application may be used to apply the phenol-formaldehyde to a thickness of about 0.0001 to 0.001 inches ($2.54\times10^{-4}$ to $2.54\times10^{-3}$ centimeters). In the air brush application, the phenol-formaldehyde resin has a solids content within the range of about 29 to 39% by weight.

Figure 1:
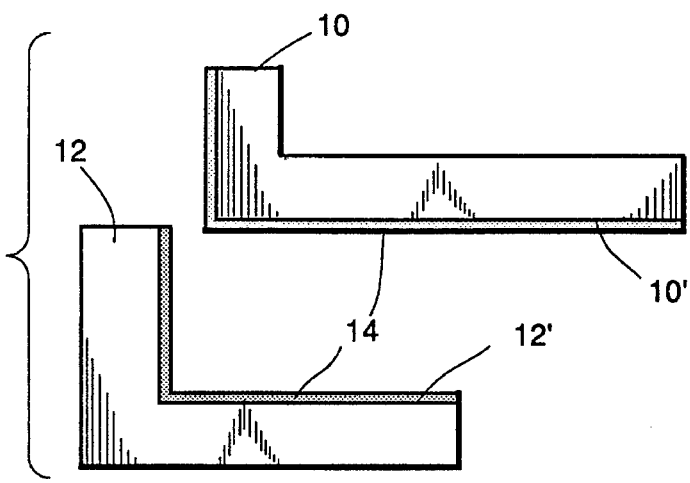
FIG. 1 shows two shaped parts ready for coating the outside upper part and the inside lower part with adhesive.
Figure 2:
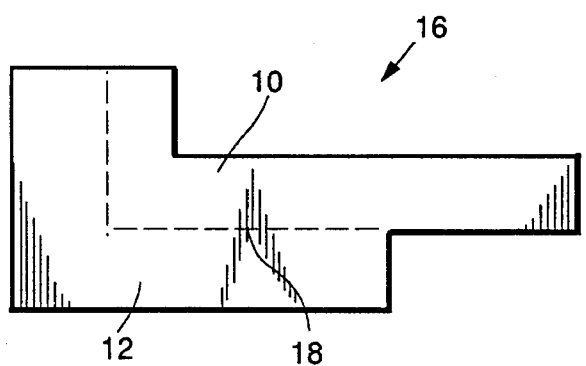
FIG. 2 shows the mated assembly and bondline.

Turning now to the Figures, wherein like numerals depict like elements, FIG. 1 shows two parts, denoted 10 and 12, which are to be bonded together. One of the mating surfaces, 10' or 12', is coated with an adhesive The two parts are then joined to provide a mated assembly 16, as shown in FIG. 2. Bondline be identifies where the bond will be made.

Figure 3:
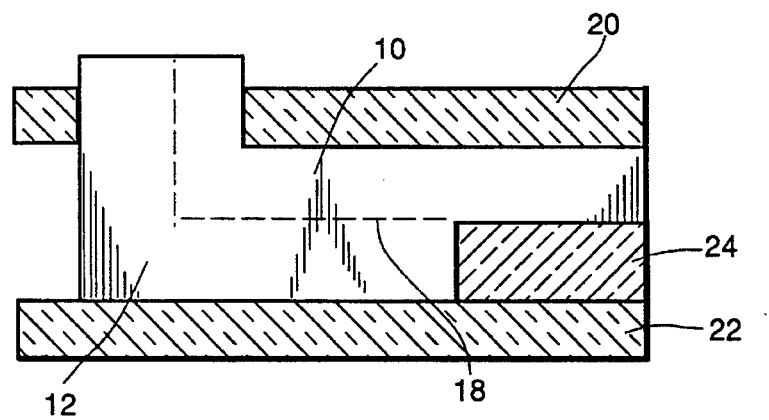
FIG. 3 shows the mated assembly placed in tooling.

As shown in FIG. 3, the mated assembly 16 is placed in tooling for insertion into the microwave oven. Specifically, the tooling comprises polytetrafluoroethylene sheets 20, 22 placed on the top and bottom surfaces of the assembly 16. Any unsupported areas are supported by appropriate spacers, such as 24.

The mated assembly 16 with tooling is placed in the microwave oven (not shown) and exposed to microwave energy for a pre-selected period of time to effect bonding. The pressure employed in the process is that necessary to hold the parts 10 and 12 together, without movement.

Figure 4:
FIG. 4 shows the bonded assembly.

FIG. 4 depicts the bonded assembly 16'.

EXAMPLES

Example 1:

Cascophen PF 335I, a phenol-formaldehyde resin commercially available from Borden, Inc., was brush applied (using a coarse acid brush) in thicknesses ranging from 0.0001 to 0.0003 inches ($2.54\times10^{-4}$ to $7.62\times10^{-4}$ centimeters) in its "as received" form (57% solids content by weight) to the raised surfaces of one shaped polystyrene foam detail produced in a lost foam process. The matching foam detail was mated at the adhesive covered surfaces, held together with just sufficient pressure to prevent part movement, and placed in a microwave oven to cure the adhesive. The microwave oven generated an output power of 650 watts at a frequency of 2550 MHz. Various foam details were bonded in this manner, with the difference between the trials being the microwave cure time. The cure times utilized are given as follows:

TABLE I

| Cure Times for Brush Coated Polystyrene Foam Detail Assemblies. | | |
|---|---|---|
| Cure Time (seconds) | Adhesive Condition | Substrate Condition |
| 10 | incomplete cure | cool, no foaming |
| 20 | cured | cool, no foaming |
| 30 | cured | cool, no foaming |
| 45 | cured, extraneous adhesive bubbled | cool, no foaming |

TABLE I-continued

| Cure Times for Brush Coated Polystyrene Foam Detail Assemblies. | | |
|---|---|---|
| Cure Time (seconds) | Adhesive Condition | Substrate Condition |
| 60 | cured | warm, foamed at interface |

The aforementioned trials illustrated that brush application should be performed with a fine artist's brush to minimize the application of extraneous adhesive (which was particularly pronounced in the 45 second cured specimen). The preferred cure times appeared to be between 20 and 45 seconds, with 30 seconds being the optimum.

Example 2:

Cascophen PF 335I was diluted with deionized water in a ratio of 30 milliliters of adhesive to 10 milliliters of water in order to allow air brush application to additional polystyrene lost foam details. In addition, this adhesive was air brushed onto rectangular sections of polystyrene packaging foam. The resulting calculated solids content of the adhesive was 34% by weight. Using the fixturing procedure described in Example 1, foam sections were cured for 20, 30, and 45 seconds in the same microwave oven. The only differences in cure behavior from the previous example were: (1) the packaging foam section cured for 20 seconds pulled apart with handling pressure; and (2) the 45 second cured packaging foam section did not exhibit adhesive bubbling at the site of extraneous material. In comparison with the brush application, spraying the adhesive with the air brush minimized the deposition of extraneous adhesive on the non-bonding surfaces. The 30 and 45 second microwave cured packaging foam details were fabricated into flatwise tensile coupons in order to determine the adhesive structural strength. These specimens possessed flatwise tensile strength values of 9 psi and 10 psi, respectively. Failure was 100% cohesive.

The microwave bonding of polystyrene foam details (lost foam as well as packaging foam) with the phenol-formaldehyde adhesive process described herein results in a low energy usage and rapid process that provides facile processibility and structural strength.

Thus, there has been disclosed an improved method for microwave bonding polystyrene foam details together, using phenol-formaldehyde compounds, to produce lost foam molds suitable for casting metallic details. It will be readily apparent to those of ordinary skill in this art that various changes and modifications of an obvious nature may be made, and all such changes and modifications are considered to fall within the scope of the invention, as defined by the appended claims.

What is claimed is:

1. A method for bonding polystyrene foam details together, which consists of:

(a) providing polystyrene foam details including at least one shaped non-planar surface;

(b) applying a microwave curing adhesive coating consisting of water and a phenol-formaldehyde resin having a ratio of formaldehyde to phenol of about 1.8 to 2.3 on a molar basis and a solids content of 47 to 67% by weight to said surface of said polystyrene foam detail, wherein said coating has a thickness ranging from about 0.0001 to 0.01 inches ($2.54 \times 10^{-4}$ to $2.54 \times 10^{-2}$ centimeters);

(c) placing said adhesive coated polystyrene foam detail in contact with an uncoated mating polystyrene foam detail to produce a mated assembly; and (d) exposing said mated assembly to microwave energy for 20 to 45 seconds to cure said adhesive and produce a bonded assembly.

2. The method of claim 1 wherein said adhesive coating is applied to said surface by brush application.

3. The method of claim 2 wherein said adhesive coating is applied to a thickness ranging from about 0.0001 to 0.0003 inches ($2.54 \times 10^{-4}$ to $7.62 \times 10^{-4}$ centimeters).

4. The method of claim 3 wherein said resin has a solids content of about 57% by weight.

5. The method of claim 1 wherein said joined assembly is cured by placing said joined assembly in a microwave oven having output power of about 650 watts at a frequency of about 2550 megahertz and exposing said joined assembly to said microwave energy.

6. A method for bonding polystyrene foam details together, which consists of:

(a) providing polystyrene foam details including at least one shaped non-planar surface;

(b) applying a microwave curing adhesive coating consisting of water and a phenol-formaldehyde resin having a ratio of formaldehyde to phenol of about 1.8 to 2.3 on a molar basis and a solids content of 29 to 39% by weight to said surface of said polystyrene foam detail, wherein said coating has a thickness ranging from about 0.0001 to 0.001 inches ($2.54 \times 10^{-4}$ to $2.54 \times 10^{-3}$ centimeters);

(c) placing said adhesive coated polystyrene foam detail in contact with an uncoated mating polystyrene foam detail to produce a mated assembly; and (d) exposing said mated assembly to microwave energy for 30 to 45 seconds to cure said adhesive and produce a bonded assembly.

7. The method of claim 6 wherein said joined assembly is cured by placing said joined assembly in a microwave oven having output power of about 650 watts at a frequency of about 2550 megahertz and exposing said joined assembly to said microwave energy.

8. The method of claim 6 wherein said adhesive coating is applied to said surface by air brush application.

9. The method of claim 8 wherein said resin has a solids content of about 34% by weight.

* * * * *